US010477396B2

(12) United States Patent
Schultz et al.

(10) Patent No.: US 10,477,396 B2
(45) Date of Patent: *Nov. 12, 2019

(54) AFFILIATION AND DISAFFILIATION OF COMPUTING DEVICES

(71) Applicant: Verizon Patent and Licensing Inc., Arlington, VA (US)

(72) Inventors: Paul T. Schultz, Colorado Springs, CO (US); Robert A. Sartini, Colorado Springs, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/837,747

(22) Filed: Dec. 11, 2017

(65) Prior Publication Data
US 2018/0103375 A1 Apr. 12, 2018

Related U.S. Application Data

(63) Continuation of application No. 14/254,610, filed on Apr. 16, 2014, now Pat. No. 9,888,379.

(51) Int. Cl.
*H04W 12/06* (2009.01)
*H04L 29/06* (2006.01)
(Continued)

(52) U.S. Cl.
CPC .......... *H04W 12/06* (2013.01); *G06F 16/381* (2019.01); *H04L 63/0492* (2013.01);
(Continued)

(58) Field of Classification Search
CPC ... H04W 12/06; H04W 4/80; G06F 17/30725; H04L 63/0492; H04L 63/08; H04L 67/04; H04L 67/125; H04L 67/18; H04L 67/22
(Continued)

(56) References Cited

U.S. PATENT DOCUMENTS 4,891,650 A * 1/1990 Sheffer ................. B60R 25/102
340/990
6,804,216 B1 10/2004 Kuwahara et al.
(Continued)

FOREIGN PATENT DOCUMENTS

WO WO-2015085402 A1 * 6/2015 ............. G06Q 10/10

OTHER PUBLICATIONS

Gallotto, Sara et. al, "Security Management of Bring-Your-Own-Devices", Worldcomp Proceedings, pp. 1-7 (Year: 2014).*
(Continued)

*Primary Examiner* — Harunur Rashid
*Assistant Examiner* — Sakinah White Taylor

(57) ABSTRACT

Techniques described herein may provide for affiliation and disaffiliation of devices, such as office communication devices, associated with a user. The affiliation/disaffiliation may be performed using a mobile device (e.g., a smart phone). In one implementation, a method may include receiving a request to affiliate a user with one or more office devices; and receiving context data, from a mobile device, relating to a current context of the mobile device. The method may further include determining, based on the context data, to authorize the affiliation of the user with the one or more office devices; and provisioning, based on the determination to authorize the affiliation, the one or more office devices to customize the one or more office devices for the user.

19 Claims, 10 Drawing Sheets

(51) Int. Cl.
*G06F 16/38* (2019.01)
*H04W 4/80* (2018.01)
H04L 29/08 (2006.01)
H04W 12/08 (2009.01)
H04W 12/00 (2009.01)

(52) U.S. Cl.
CPC .............. *H04L 63/08* (2013.01); *H04W 4/80* (2018.02); *H04L 67/04* (2013.01); *H04L 67/125* (2013.01); *H04L 67/18* (2013.01); *H04L 67/22* (2013.01); *H04W 12/00503* (2019.01); *H04W 12/00522* (2019.01); *H04W 12/08* (2013.01)

(58) Field of Classification Search
USPC .......................................................... 726/4
See application file for complete search history.

(56) References Cited

U.S. PATENT DOCUMENTS

| | | | |
|---|---|---|---|
| 8,639,621 B1 | 1/2014 | Ellis et al. | |
| 8,644,473 B1* | 2/2014 | Bardwell | H04M 3/42263 379/201.01 |
| 8,896,416 B1 | 11/2014 | Lundy et al. | |
| 2006/0121885 A1 | 6/2006 | Engstrom et al. | |
| 2007/0258423 A1* | 11/2007 | Kulkarni | H04W 88/04 370/338 |
| 2008/0155094 A1 | 6/2008 | Roese et al. | |
| 2008/0214111 A1 | 9/2008 | Moshir et al. | |
| 2009/0125459 A1 | 5/2009 | Norton et al. | |
| 2010/0217780 A1 | 8/2010 | Erola et al. | |
| 2011/0063093 A1 | 3/2011 | Fung et al. | |
| 2012/0054355 A1 | 3/2012 | Arrasvuori et al. | |
| 2012/0252405 A1* | 10/2012 | Lortz | G06F 8/60 455/410 |
| 2012/0310720 A1 | 12/2012 | Balsan et al. | |
| 2013/0059622 A1 | 3/2013 | Agulnik et al. | |
| 2013/0209108 A1* | 8/2013 | Krishnakumar | H04L 69/14 398/130 |
| 2013/0268999 A1 | 10/2013 | Kiang et al. | |
| 2014/0047560 A1* | 2/2014 | Meyer | G06F 21/62 726/28 |
| 2014/0108792 A1* | 4/2014 | Borzycki | G06F 21/6218 713/165 |
| 2014/0278594 A1 | 9/2014 | Vivadelli et al. | |
| 2014/0344446 A1* | 11/2014 | Rjeili | H04L 43/04 709/224 |
| 2015/0181548 A1* | 6/2015 | Varoglu | H04W 64/00 455/456.2 |
| 2015/0381610 A1* | 12/2015 | Poornachandran | H04L 63/0853 713/155 |
| 2018/0012011 A9* | 1/2018 | Spencer, III | G06F 21/316 |

OTHER PUBLICATIONS

Vorakulpipat, Chalee et. al, "Managing Mobile Device Security in Critical Infrastructure Sectors", ACM Digital Library, pp. 1-4 (Year: 2014).*

* cited by examiner

AFFILIATION AND DISAFFILIATION OF COMPUTING DEVICES

CROSS-REFERENCE TO RELATED APPLICATION

This Application is a continuation of, and claims priority from, U.S. patent application Ser. No. 14/254,610, titled "AFFILIATION AND DISAFFILIATION OF COMPUTING DEVICES," filed Apr. 16, 2014, the contents of which are herein incorporated by reference in their entirety.

BACKGROUND

"Hoteling" and "hot desking" refer to techniques for supporting unassigned seating in an office environment. Both techniques are commonly used in business environments in which an office worker spends a limited amount of time at a desk. For example, knowledge workers, salespeople, customer representatives, and consultants may tend to spend a limited portion of their time at the office. The increasing popularity of teleworking may also contribute to a reduced presence in the office. Additionally, some workers may benefit from using different types of workspaces when performing different tasks. In recognition of this, companies may use hoteling and hot desking arrangements to more efficiently use office space and equipment. Instead of assigning a worker to a permanent workspace, workers may switch between available workspaces.

Hoteling may refer to unassigned seating of workspaces in which a worker may first reserve a particular workspace. Hot desking may refer to reservationless assignment of workspaces. With either technique, a worker that wishes to use a particular workspace may, after arriving at the workspace, spend time configuring the workspace. Configuring a workspace may include entering worker credentials (e.g., user name and passwords) to log in to office devices (e.g., telephones, computing devices, etc.) at the workspace and/or to otherwise cause the office devices to be provisioned for the worker.

DETAILED DESCRIPTION OF PREFERRED EMBODIMENTS

The following detailed description refers to the accompanying drawings. The same reference numbers in different drawings may identify the same or similar elements.

Techniques described herein may provide for convenient affiliation and disaffiliation of devices, such as office communication devices, associated with a user. The affiliation/disaffiliation may be performed using a mobile device (e.g., a smart phone). The mobile device may be used to detect nearby devices that are eligible for affiliation and may assist in the authentication and authorization of the devices. In one implementation, in response to successful authentication and authorization, the devices may be provisioned. For example, for an office telephone, the telephone may be automatically assigned a telephone number associated with the user and configured with call log data corresponding to previous calls of the user.

Techniques described herein may also operate to assist in conveniently disaffiliating the user with previously affiliated devices. For example, a user may "check out" of a workspace by selecting a "disaffiliate" option on an application implemented by the user's mobile device. As another example, the user's mobile device may monitor the user's current location with respect to the workspace, and may automatically disaffiliate the affiliated devices (e.g., unprovision the affiliated devices by removing all personal information relating to the user) or place the affiliated devices in a "suspend" mode, in which the affiliated devices cannot be used by other users.

FIGS. 1A-1D are diagrams illustrating an example of an overview of concepts described herein. In FIGS. 1A-1D, an example will be provided of automatic affiliation and disaffiliation of a user, with a workspace that includes an office communication device (e.g., a desktop telephone).

Figure 1A:
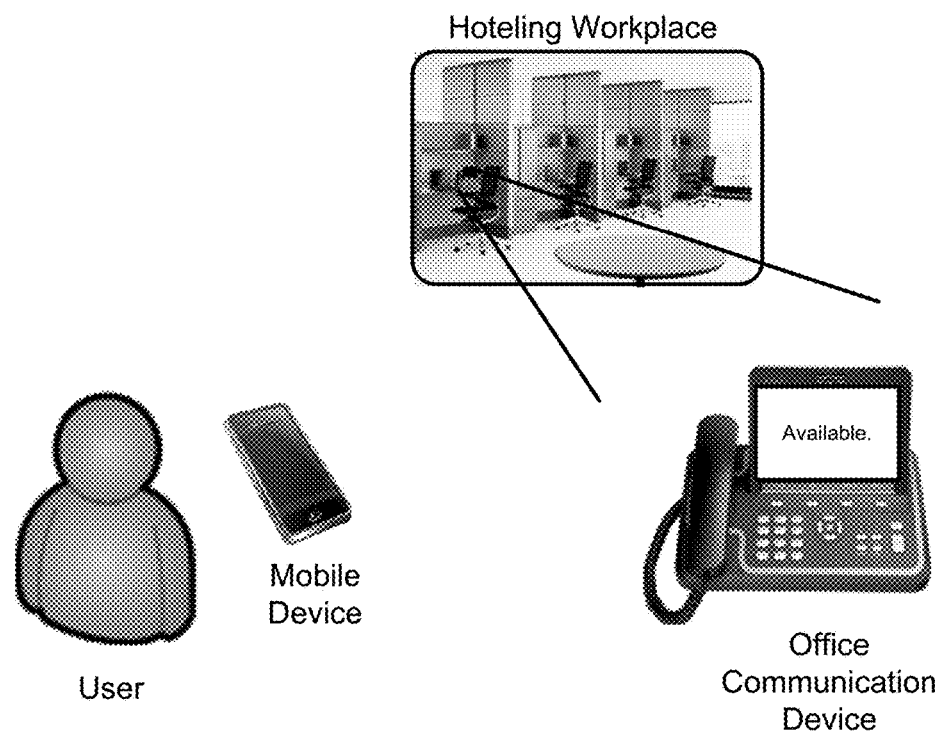
FIGS. 1A-1D are diagrams illustrating an example of an overview of concepts described herein.
Figure 1B:
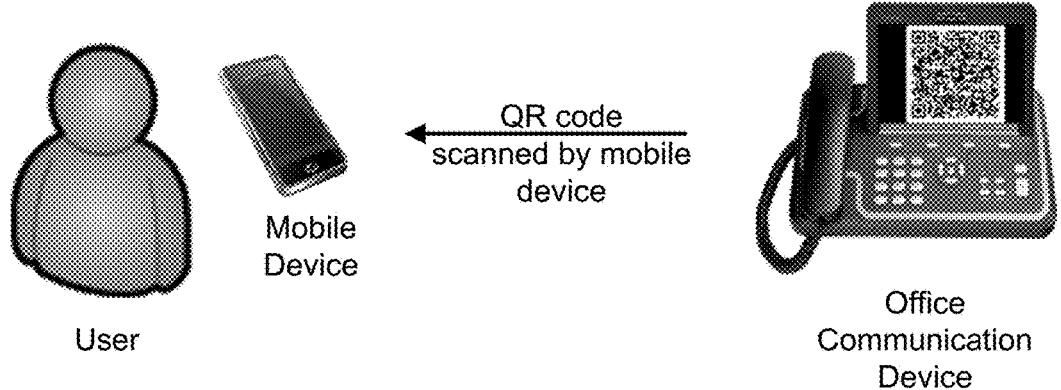

As shown in FIG. 1A, a user may be associated with a mobile device, such as a smart phone. The user may be an employee of a company that uses hoteling (or hot desking) techniques to manage workspaces. Each workspace may include devices, such as telephones, personal computers, network devices, printers, and/or other communication or computing devices that may be used by the employees of the company in the course of business. In this example, an office communication device (e.g., a desktop telephone) is illustrated as being associated with a workspace.

Consistent with implementations described herein, the user may indicate, such as through an application executing at the mobile device, a desire to affiliate with the office communication device. In response, the mobile device may discover nearby office communication devices. For example, the mobile device and the office communication device may communicate with a remote affiliation component and/or the mobile device and the office communication device may directly discover one another (e.g., via a short range wireless connection such as Bluetooth, Wi-Fi Direct, or another technique). The mobile device may thus identify the office communication device, determine the location of the office communication device, determine the availability of the office communication device (e.g., whether the office communication device is available for the user or is being used by another user), and/or determine capabilities associated with the office communication device. In some implementations, an unaffiliated office communication device may display a message such as "available." In this example, device discovery may simply refer to the user noticing the message on the office communication device.

The mobile device may inform the user of nearby available office communication devices and may provide the user with an option to initiate affiliation. In the example shown in FIG. 1B, office communication devices that are available for affiliation may display a bar code, such as a quick response (QR) code. The user may initiate affiliation with the office communication device by scanning the QR code with the user's mobile device. The QR code may include, for example, an identifier associated with the office communication device. Additionally, the QR code may include network information related to the office equipment (e.g., IP address, network connections, etc.) and/or security information (e.g., what mobile devices can communicate directly with this office equipment, what users can affiliate with this office equipment, etc.).

In some situations, an initial authentication, authorization, and accounting (AAA) process may be performed to verify the user is eligible to affiliate with the office communication device. The AAA process may be performed automatically by the user's mobile device based on context information associated with the mobile device (e.g., a current location of the mobile device, network connection information associated with the mobile device, and/or other information associated with the office communication device).

Figure 1C:
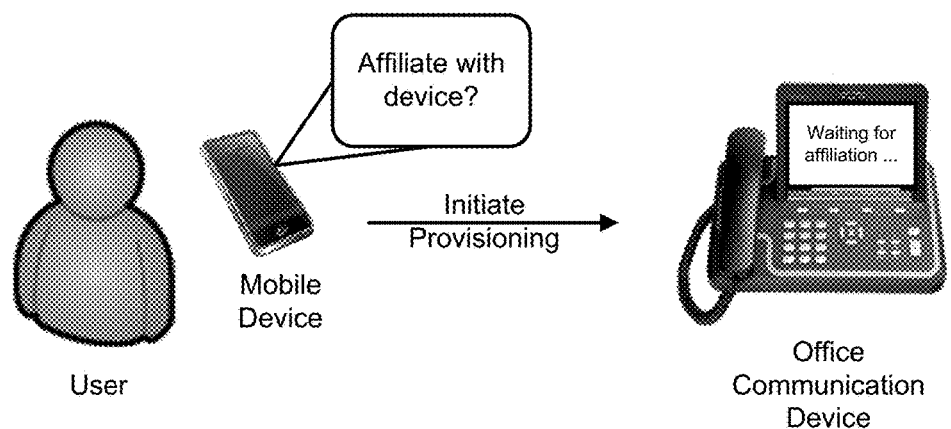
Figure 1D:
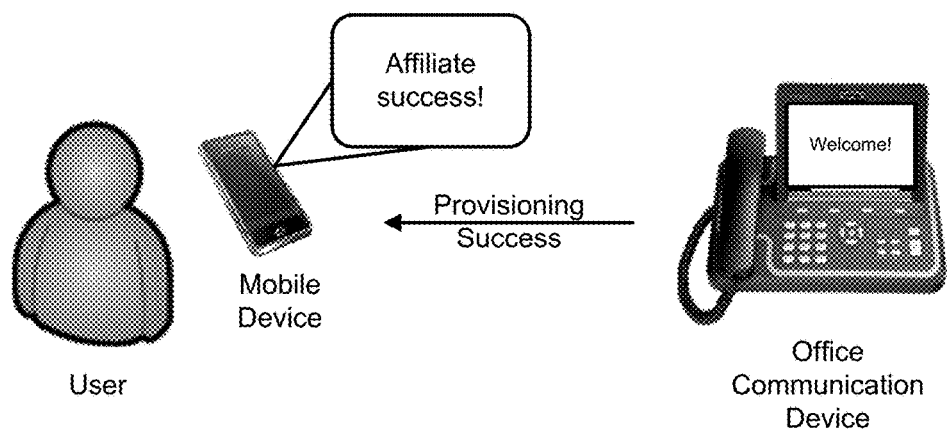

As shown in FIG. 1C, in this example, after scanning in the QR code, the mobile device may prompt the user to verify that the user wishes to affiliate with the office communication device. When the user verifies that the user would like to affiliate with the office communication device, a provisioning process may be initiated. The provisioning process may include downloading configuration information to the office communication device that is specific to the particular user. For example, the office communication device may be assigned a telephone number associated with the user and may receive call history information (e.g., a recent history of telephone calls made and received at the telephone number) associated with the user. Additionally, the office communication device may receive additional user information such as the user's contact list/address book and/or communications preferences. As illustrated in FIG. 1D, when the office communication device is successfully provisioned, the mobile device may display a message indicating successful affiliation of the office communication device with the user.

With the example affiliation process illustrated in FIGS. 1A-1D, a user may initiate affiliation with a workspace using the user's mobile device. The affiliation process may be a relatively convenient process that may potentially be performed from the user's mobile device. Authentication and/or authorization may be performed automatically based on information associated with the mobile device and/or the office communication device. The affiliation process may customize the workspace for the particular user.

Figure 2:
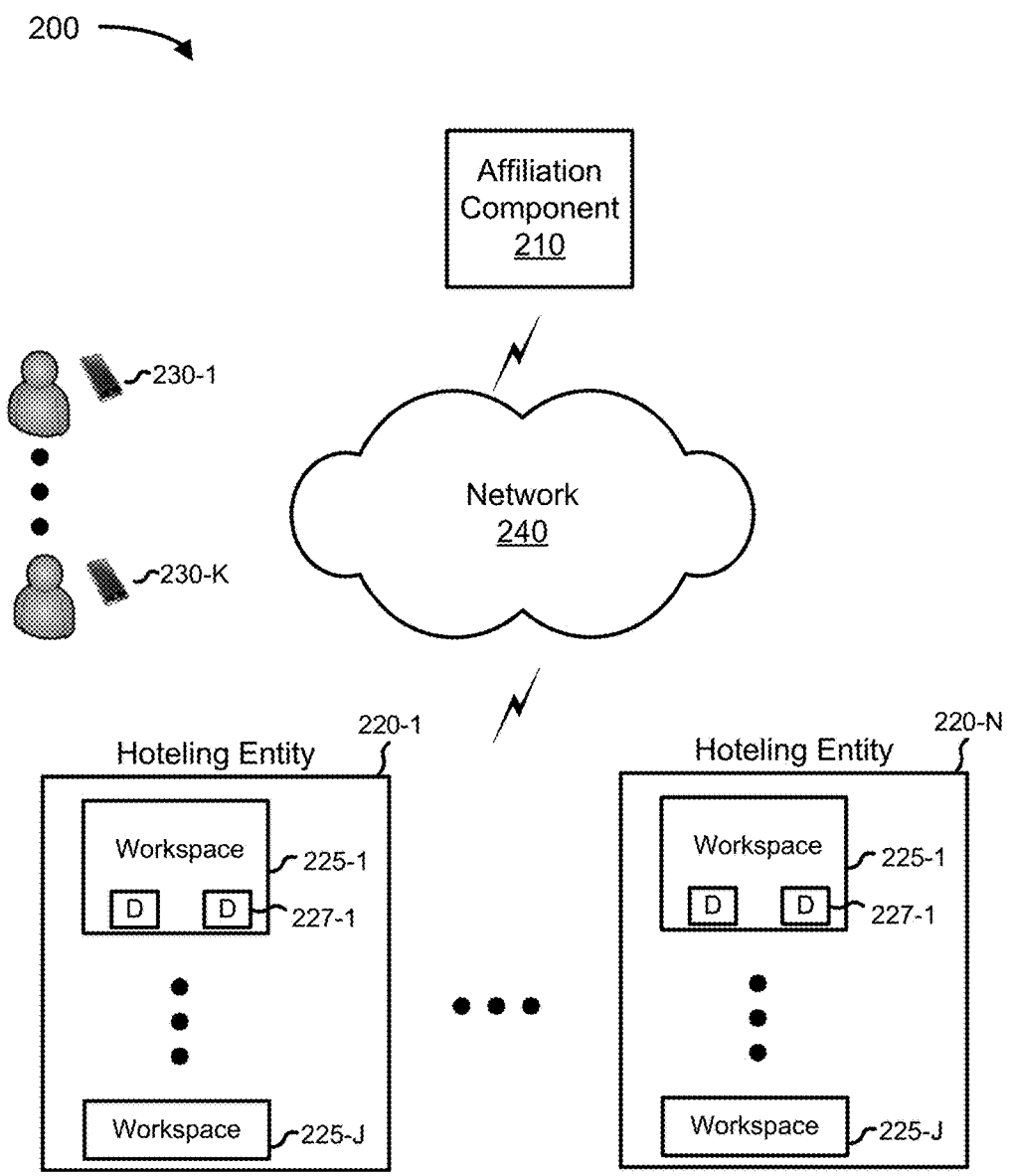
FIG. 2 is a diagram illustrating an example environment in which systems and/or methods described herein may be implemented.

FIG. 2 is a diagram illustrating an example environment 200, in which systems and/or methods described herein may be implemented. As shown in FIG. 2, environment 200 may include affiliation component 210, hoteling entities 220-1 through 220-N (where N is an integer >=1), mobile devices 230-1 though 230-K (where K is an integer >=1), and network 240.

Affiliation component 210 may include one or more computing devices that perform operations relating to affiliating and disaffiliating of workspaces with users. Affiliation component 210 may be implemented by an entity that offers affiliation and disaffiliation operations as a service. For example, affiliation component 210 may be maintained or managed by a telecommunications company, such as one that operates network 240 and/or that provides telecommunication services to hoteling entities 220. In other implementations, affiliation component 210 may be maintained by another entity, such as one of hoteling entities 220. Affiliation component 210 may perform, for example, AAA functions relating to device affiliation, context management relating to device affiliation, and endpoint provisioning and management control relating to device affiliation. Operations performed by affiliation component 210 will be discussed in more detail below.

Hoteling entities 220-1 through 220-N (hereinafter sometimes referred to individually as "hoteling entity 220" and collectively as "hoteling entities 220") may each represent a business, office, or other entity that implements hoteling or hot desking to share office resources. As used herein, shared office resources will be referred to as workspaces 225-1 through 225-J (hereinafter sometimes referred to individually as "workspace 225" and collectively as "workspaces 225", where J is an integer >=1). Each workspace 225 may represent a cubicle, desk, office or other area that includes one or more devices 227 that may be assigned to a user that uses workspace 225. In one implementation, each device 227 may be a computing device that may be provisioned based on information specific to a particular user. For example, when device 227 includes a telephone, device 227 may be provisioned to include the telephone number and a call history log associated with the user. When device 227 includes a desktop computer, device 227 may be provisioned to include files, application permissions, or other customization information relating to the user. In addition to a telephone and a desktop computer, devices 227 may be, as non-limiting examples, tablet computers, wearable computers, video conferencing systems, entertainment systems, electronic whiteboard systems, other communication and collaboration systems, etc.

Mobile devices 230-1 through 230-K (hereinafter sometimes referred to individually as "mobile device 230" and collectively as "mobile devices 230"), may each include any computation and communication device, such as a wireless mobile communication device that is capable of communicating with affiliation component 210 via network 240. Mobile devices may be associated with users that may use workspaces 225. Mobile devices 230 may include, for example, a radiotelephone; a personal communications system ("PCS") terminal (e.g., a device that combines a cellular radiotelephone with data processing and data communications capabilities); a personal digital assistant ("PDA") (e.g., a device that includes a radiotelephone, a pager, Internet/intranet access, etc.); a smart phone; a laptop computer; a tablet computer; a camera; a personal gaming system; a smart watch (e.g., watches that can perform task and display information to a user by connecting to a local or remote server); a pair of smart glasses (e.g., glasses capable of connecting to local or remote servers containing a way to display information to a user), or another type of mobile computation and communication device.

Network 240 may represent a wireless network (e.g., a wireless cellular network) and/or a wired network through which mobile devices 230 and/or hoteling entities 220 may communicate. Network 240 may include a wide area network ("WAN"), a metropolitan area network ("MAN"), the Internet, a fiber optic-based network, and/or a combination of these or other types of networks. In one implementation, network 240 may include a wireless network that is implemented based on the Long Term Evolution ("LTE") standard. In other implementations, network 240 may include a wireless network implemented based on other standards, such as a Code Division Multiple Access ("CDMA") 2000 1× network, a second generation ("2G") wireless network, a third generation ("3G") wireless network, a fourth generation ("4G") wireless network, a fifth generation ("5G") wireless network, a "Wi-Fi" wireless network (e.g., a network that operates according to an Institute of Electrical and Electronics Engineers ("IEEE") 802.11 standard), and/or another wireless network. In some implementations, network 240 may be communicatively coupled to one or more other networks.

Figure 3:
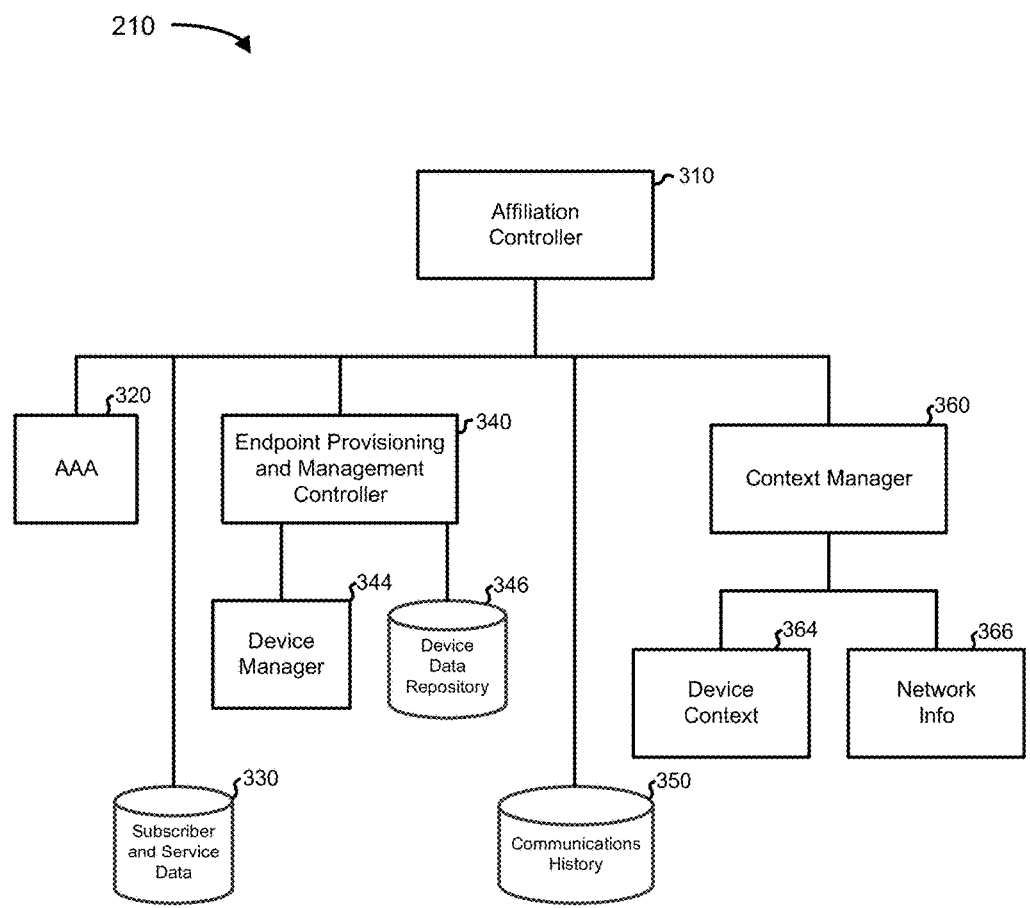
FIG. 3 is a diagram illustrating an example of functional components of an affiliation component.

FIG. 3 is a diagram illustrating an example of functional components of affiliation component 210. The functional components of affiliation component 210 may be implemented on one or more computing devices (e.g., computer servers) or network devices. As illustrated, affiliation component 210 may include affiliation controller 310, AAA component 320, subscriber and service data component 330, endpoint provisioning and management controller 340, communications history component 350, and context manager component 360. Endpoint provisioning and management controller 340, as is further illustrated in FIG. 3, may include device management component 344 and device data repository 346. Context manager component 360 may include device context component 364 and network information component 366.

Affiliation controller 310 may include one or more computing devices that act as a control point for the performance of affiliation services. Affiliation controller 310 may, for example, receive affiliation requests from mobile devices 230 and/or devices associated with workspaces 225. Affiliation controller 310 may access components 320-366 to respond to the requests.

AAA component 320 may include one or more devices that perform authentication, authorization, and/or accounting functions relating to affiliation and disaffiliation. Authentication may refer to the determination of whether a particular user or a particular mobile device 230 is in fact the user/mobile device 230 that is being claimed. In some implementations, a user may be authenticated, by AAA component 320, based on the user using a particular mobile device 230, that was previously registered as being possessed by the user, to perform the affiliation. In other implementations, AAA component 320 may require additional information to authenticate a particular user (e.g., the user may also be required to enter a password, the user may be required to perform biometric authentication). Authorization may refer to the determination of whether a particular user is authorized to use a particular workspace 225. In some implementations, hoteling entity 220 may maintain a number of different types of workspaces 225. Some types of workspaces 225 may only be usable by certain employees (e.g., an "accounting" workspace 225 may only be useable by employees that are assigned to the accounting department of the company). AAA component 320 may maintain authorization information, for employees of a company, that indicates which workspaces 225 each employee is authorized to use. Accounting functions may relate to keeping track of which employees use and/or are currently using particular workspaces 225 and/or the resources used by the employees. AAA component 320 may maintain one or more data structures that may be updated to keep track of accounting information.

Subscriber and service data component 330 may include one or more computing devices that store data about subscribers (e.g., users of mobile devices 230) and/or services relating to the subscribers. In one implementation, subscriber and service data component 330 may be maintained by an operator of network 240, and may include information relating to mobile devices 230, such as: subscriber profiles, a telephone number, an International Mobile Equipment Identity ("IMEI") value, an International Mobile Subscriber Identity ("IMSI") value, capabilities of mobile devices 230, subscribed services associated with mobile devices 230, and/or other information. Alternatively or additionally, subscriber and service data component 330 may store additional information, such as corporate directories, contact lists/address books, single sign-on ("SSO") credentials, universal identity service credentials, etc. Information stored by subscriber and service data component 330 may be used during the AAA process. In some implementations, subscriber and service data component 330 may additionally store information, such as the information mentioned above, for devices 227 that are associated with workspaces 225.

Endpoint provisioning and management controller 340 may include one or more computing devices that perform automated provisioning of devices associated with workspaces 225. Endpoint provisioning and management controller 340 may include device management component 344 and device data repository 346. Device management component 344 may include, for example, logic to remotely provision devices (e.g., telephones, computers, other computing devices, etc.). Device data repository 346 may include may include information relating to different devices that may be provisioned. For example, device data repository 346 may include information relating to specific devices (e.g., device-specific passwords and/or other device specific information), specific device make/model of devices, and/or other information. Endpoint provisioning and management controller 340 may use the device provisioning logic of device management component 344 and the device specific data associated with device data repository 346 to automatically provision particular devices as part of the affiliation of the devices with users.

Communications history component 350 may include one or more devices that store information relating to user communication history. The information may include, for example, call log data for users, user web browser requests, or other types of data relating to previous user communications. The information, stored by communications history component 350, can potentially be downloaded as part of a device affiliation process, so that a user can view his or her communication history (e.g., call log history, browser history, etc.) as if the user worked at a single workstation.

Context manager component 360 may include one or more computing devices that monitor and use device context and/or network information associated with mobile device 230. Context manager 360 may include device context component 364 and network information component 366. The network information and/or device context information, stored by device context component 364, may generally include information that is known about a user based on the physical location of the user (e.g., as obtained via a GPS unit associated with the user's mobile device) and/or based on particular networks to which mobile device 230 is connected. For example, with regard to network information, context manager 360 may maintain information relating to a current cell site, associated with network 240, to which mobile device 230 is connected, as well as to a particular Wi-Fi access point, within hoteling entity 220, to which mobile device 230 is connected. Device context component 364 may maintain information relating to a context of mobile device 230 and/or devices 227, such as the physical location. Network information component 366 may maintain network context information. The network context may refer to information, obtained based on network connectivity, relating to network connectivity of mobile device 230 and/or devices 227.

While FIGS. 2 and 3 illustrate example components of environment 200, in other implementations, environment 200 may contain fewer components, different components, differently arranged components, or additional components than those depicted. Alternatively, or additionally, one or more components of environment 200 may perform one or more other tasks described as being performed by one or more other components of environment 200.

Figure 4:
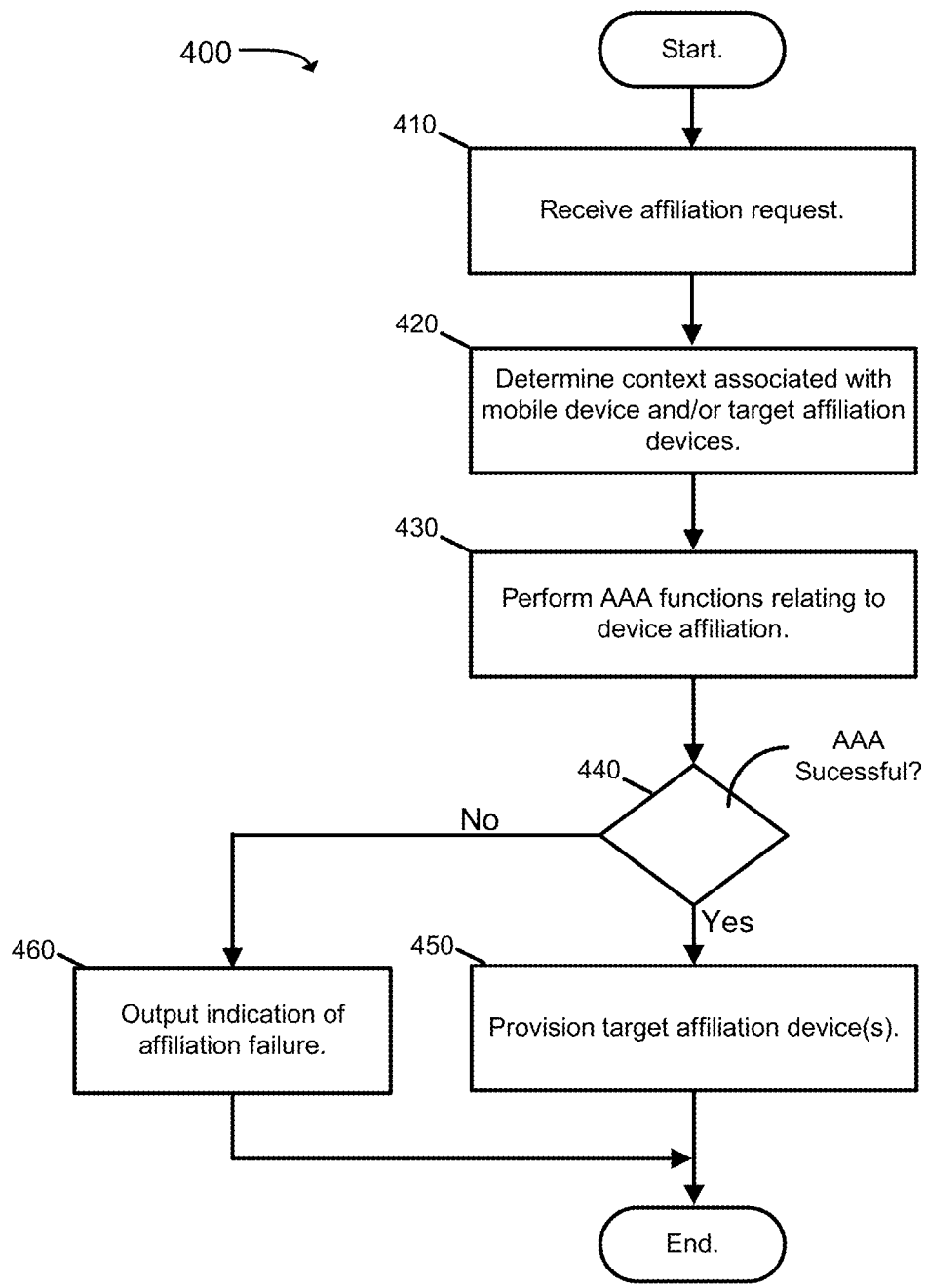
FIG. 4 is a flow chart illustrating an example process relating to affiliation and disaffiliation of a workstation.

FIG. 4 is a flow chart illustrating an example process 400 relating to affiliation and disaffiliation of a workstation. Process 400 may be performed by affiliation component 210. Alternatively or additionally, process 400 may be performed by a combination of affiliation component 210, devices 227, and/or mobile devices 230.

A user of mobile device 230 may desire to affiliate with one or more devices 227 at a particular workspace 225. For example, a salesperson of a particular hoteling entity 220 may visit the office a few days a week. When at the office, the salesperson may choose an available workspace (e.g., an available desk with a desktop telephone and desktop computer). The salesperson may indicate, such as through an application implemented by the salesperson's mobile device 230 (e.g., a smart phone), that the salesperson wishes to use a particular available workspace 225 and affiliate with the corresponding devices 227. Mobile device 230 may transmit the affiliation request to affiliation component 210.

Process 400 may include receiving the affiliation request (block 410). The affiliation request may include an indication of the workspace that is to be affiliated. For example, mobile device 230 may display a graphical map of workspaces 225, including an indication of which of workspaces 225 are available. The user may select a desired available workspace 225. As another example, each workspace 225 at a particular hoteling entity 220 may include a code or other identifier of workspace 225. For instance, in the example shown in FIG. 1B, a device 227 (e.g., an office communication device) may display a QR code which may be scanned by mobile device 230. The affiliation request may also include an identifier of mobile device 230 (e.g., the telephone number or another unique identifier associated with mobile device 230). As another example, mobile device 230 may communicate with nearby workspaces 225, such as via a short range wireless communication technique (e.g., using Bluetooth, near field communication, or Wi-Fi Direct), to obtain a list of nearby workspaces that are available for affiliation. Mobile device 230 may provide a list of the nearby workspaces 225, to the user of mobile device 230, for selection of a desired workspace. In one implementation, block 410 may be performed by affiliation controller 310 of affiliation component 210.

Process 400 may further include determining a context associated with a mobile device and/or with a target affiliation device (block 420). For mobile device 230, the context may include context that is based on the mobile device (mobile device context) and context associated with network connectivity of the mobile device (network context). The mobile device context may include a location of mobile device 230, such as geographic location based on a GPS data from mobile device 230. Alternatively or additionally, the context may include other information, such as an indication of computing devices that are near mobile device 230. For example, mobile device 230 may communicate with nearby devices 227, such as via a short range wireless communication technique or via near field communication ("NFC") techniques, to obtain an approximate location of mobile device 230 (e.g., expressed as a relative location that is "nearby" a device 227 or, if the location of device 227 is known, as an absolute location). The mobile device context may include additional information, such as the operating status of mobile device (e.g., applications executing by the mobile device, an operating system installed at the mobile device, security level of the mobile device, other capabilities of the mobile device, etc.). Still further, the mobile device context may include data received via sensors of the mobile device (e.g., an image taken by a camera, accelerometer data, radio frequency identification ("RFID") sensors, NFC tags, etc.).

The network context of mobile device 230 may include information relating to networks to which mobile device 230 is connected. The information may include, for example, a cell site (e.g., in a cellular network) to which mobile device 230 is connected and/or the network technology used to connect to the cell site, a Wi-Fi access point to which mobile device 230 is connected, or other information relating to network context.

For a target affiliation device, the context may include the location of the device, the operating status of the device, provisioning data relating to the device, networks to which the device is connected, security level of the device, etc. The target affiliation devices may include devices 227 associated with the workspace 225 to which a user wishes to be affiliated. The context may include context that is based on device 227 and context associated with network connectivity of device 227.

In one implementation, the determination of the context, as performed with respect to block 420, may be performed by context manager 360, device context component 364, and network information component 366.

Process 400 may further include performing AAA functions relating to device affiliation (block 430). The AAA functions may generally relate to determining that the user requesting device affiliation is authentic and that the user is authorized to affiliate with the device. In one implementation, the context, obtained in block 420, may be used in the performance of the AAA functions. For example, the context (e.g., context data associated with the mobile device and context data associated with the target affiliation device) may be used to generate a context confidence score that may be used to authenticate the user of the mobile device that transmitted the affiliation request. In one implementation, the AAA function may be determined to be successful when the confidence score satisfies a threshold. In other implementations, AAA component 320 may require information in addition to the automatically acquired context to authenticate a particular user (e.g., the user may also be required to enter a password). Additionally, as previously mentioned, in some implementations, AAA component 320 may maintain authorization information that may be used to determine whether a particular user is authorized to be affiliated with certain devices 227.

Process 400 may further include, when the AAA is successful (block 440—YES), provisioning the target affiliation devices (block 450). In one implementation, provisioning of the target affiliation devices may be performed by endpoint provisioning and management controller 340. Endpoint provisioning and management controller 340 may communicate with devices 227 to customize devices 227 for the affiliating user. Examples of devices that may be provisioned, to be customized for a particular user include: telephones, computers, tablet computers, or other devices. In some implementations, the context may be used to assist in or enable the provisioning process. For example, the network context of the mobile device and/or the target affiliation devices (e.g., whether the mobile device and target affiliation device is connected to a particular Wi-Fi network) may be used to determine whether to provision the target affiliation device to directly communicate with the mobile device via a Wi-Fi Direct or Bluetooth communication link.

Process 400 may further include, when the AAA is not successful (block 450—No), outputting an indication of the affiliation failure (block 460). For example, mobile device 230 may indicate, to the user, that the affiliation was not successfully completed.

In one implementation, provisioning a device that includes a telephone may include updating an emergency services database with a current location of the telephone. In this situation, correct E-911 configuration information may be maintained for the telephone.

Figure 5:
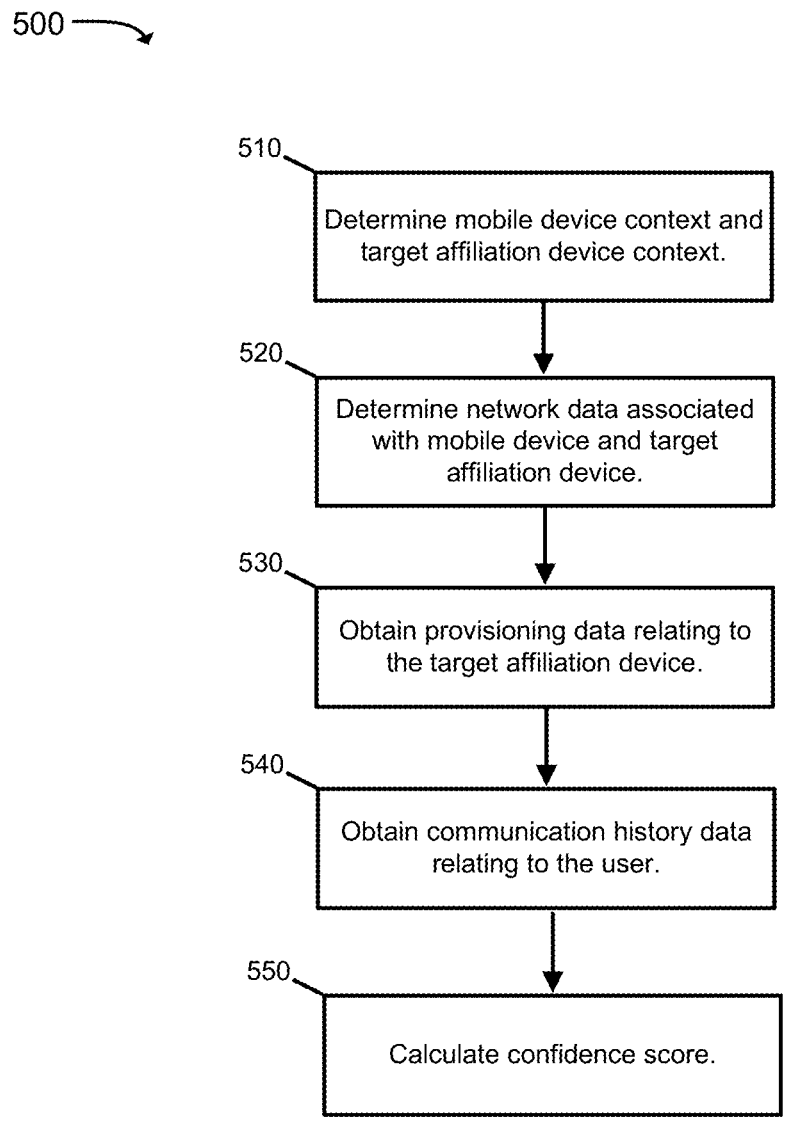
FIG. 5 is a flowchart illustrating an example process relating to the determination of context data.

FIG. 5 is a flowchart illustrating an example process 500 relating to the determination of context for a mobile device or a target affiliation device. Process 500 may correspond to block 420 of FIG. 4. Process 500 may be performed by affiliation component 210. Alternatively or additionally, process 400 may be performed by a combination of affiliation component 210, devices 227, and/or mobile devices 230.

Process 500 may include determining the context associated with the mobile device and the target affiliation device (block 510). The context, for the mobile device, may include information relating to the current state of mobile device 230, such as a location of the mobile device, information relating to other devices that are near mobile device 230, information obtained by sensors associated with mobile device 230 (e.g., acceleration data from an accelerometer, image data from a camera, audio data from a microphone, etc.) or other information relating to the state of mobile device 230. The context, for the target affiliation device, may similarly include information relating to the current state of the target affiliation device, such as a location of the target affiliation device, or other information relating to the state of the target affiliation device.

Process 500 may further include determining the network data associated with the mobile device and the target affiliation device (block 520). The network data, for mobile device 230, may include information relating to networks to which mobile device 230 is connected. The network data may include, for example, a cell site (i.e., in a cellular network) to which mobile device 230 is connected, a Wi-Fi access point to which mobile device 230 is connected, parameters or configuration information relating to network connectivity of mobile device 230 (e.g., whether a radio interface associated with mobile device 230 is based on LTE, Enhanced Voice-Data Optimized (EVDO), etc.), etc. Similarly, for the target affiliation device, the network data may include information relating to networks to which the target affiliation device is connected.

Process 500 may further include obtaining provisioning data relating to the target affiliation device (block 530). In one implementation, the provisioning data may be obtained, for example, from endpoint provisioning and management controller 340, which may obtain the provisioning data from device manager component 344 and/or device data repository 346.

Process 500 may further include obtaining communication history data relating to the user (block 540). In one implementation, the communication history data may be obtained from communication history component 350. The communication history data may include, for example, call log data for the user from a previously affiliated device (e.g., a previously affiliated desktop telephone), user web browser requests made by the user at one or more devices, or other types of data relating to previous user communications.

Process 500 may further include calculating a confidence score (block 550). The confidence score may relate to the affiliation request, such that the confidence score may be based on data associated with the mobile device that transmitted the affiliation request and based on data associated with the target affiliation device. The confidence score may be a value calculated based the data obtained/determined in blocks 510-540. The confidence score may be calculated to relate to the likelihood that the mobile device should be authenticated and/or authorized for the affiliation request. In some implementations, multiple separate confidence scores may be determined, such as a first confidence score relating to the network connectivity associated with mobile device 230 and/or device 227 and a second confidence score relating to context data for mobile device 230.

As an example of the calculation of a confidence score, assume a situation in which a user wishes to affiliate with a workspace that includes a desktop IMS-VoIP ("IP Multimedia Subsystem Voice over IP") telephone. Mobile device 230, of the user, may be at a geographic location near the workspace of the telephone and may include cellular network connectivity to a cellular network and to a Wi-Fi network. The connected cellular network may be a network that is known to be assigned to the user of mobile device 230 and the Wi-Fi network may be a network that is known to be operated by hoteling entity 220-1. In this situation, the confidence score may be calculated as a relatively high value as the mobile device context and the network data associated with the mobile device may be known as "good" data that is expected for the mobile device.

At some point, it may be desirable to disaffiliate a user with a workspace 225. For example, a user may explicitly indicate (e.g., through an application implemented by mobile device 230) that the user has finished using workspace 225. In this situation, devices 227, associated with workspace 225, may be disaffiliated such that information pertaining to the user of workspace 225 may be erased from memory of devices 227. Additionally, affiliation component 210 may mark the workspace corresponding to the disaffiliated devices as "free" or "available" for affiliation. Alternatively or additionally, disaffiliation may be explicitly indicated by the user through interaction with device 227 (e.g., by pressing a button or series of buttons on a desktop telephone).

In some implementations, disaffiliation may occur automatically based on the occurrence of certain events. For example, affiliation component 210 may initiate disaffiliation of any affiliated workspace 225 at the end of a workday, after a certain maximum affiliation time period (e.g., 10 hours) has elapsed, or based on other predetermined criteria. As another example, disaffiliation may be automatically performed based on the user traveling a certain distance away from workspace 225. The distance away from workspace 225 may be based on the user's physical location (e.g., as determined by mobile device 230 using GPS techniques, cell sector triangulation techniques, sensor-based techniques, or other techniques) or based on mobile device 230 traveling out of network range (e.g., mobile device 230 may travel out of a range of short range wireless standard such as Bluetooth, Wi-Fi, ZigBee-based communications, Z-Wave-based communication, etc.).

In some situations, it may be desirable to place devices in workspace 225 into a "suspend" mode such that unauthorized users may not be able to use the devices. The suspend mode may correspond to a temporary disaffiliation in which other users may not be able to affiliate with the workspace corresponding to the temporary disaffiliation. For example, a telephone in suspend mode may be unusable (e.g., no dial tone will be output when the headset is picked up).

Figure 6:
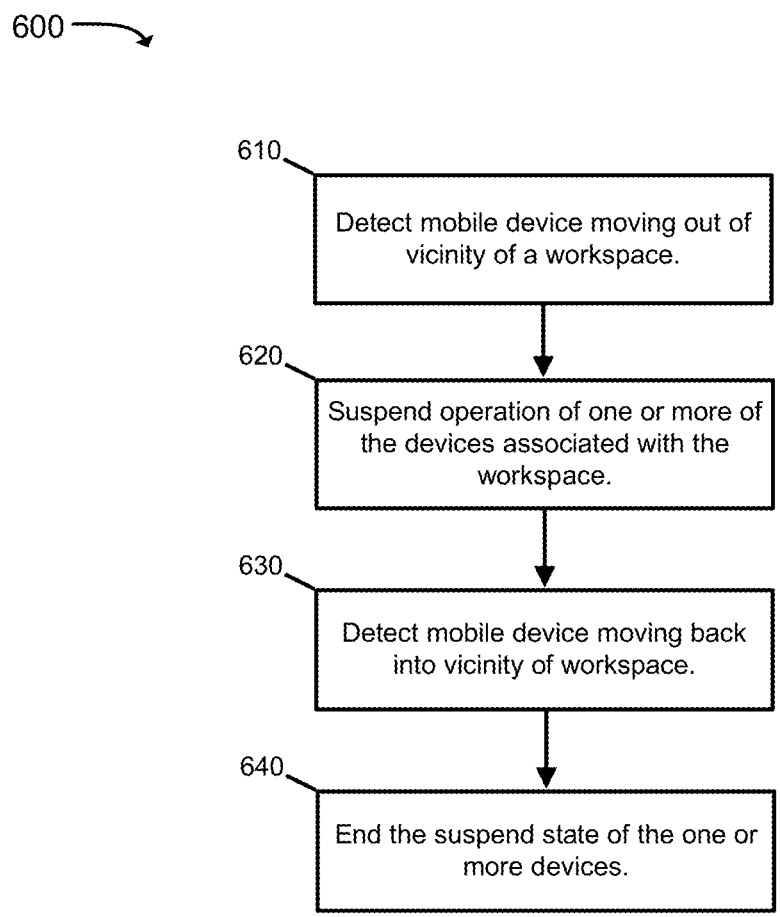
FIG. 6 is a flowchart illustrating an example process relating to suspending functionality of devices associated with a workspace.

FIG. 6 is a flowchart illustrating an example process 600 relating to suspending functionality of devices associated with a workspace. Process 600 may include detecting a mobile device moving out of the vicinity of a workspace (block 610). For example, mobile device 230, associated with particular user, may move out of range of a workspace 225. Detection of mobile device 230 moving out of the vicinity of workspace 225 may be performed using one or more of a number of possible techniques. For example, mobile device 230 may periodically or occasionally inform affiliation component 210 of the location of mobile device 230 (e.g., a location determined using GPS-based techniques). When the location of mobile device 230 becomes greater than a threshold distance away from the location of workspace 225, affiliation component 210 may determine that mobile device has moved out of the vicinity of workspace 225. As another example, the location of mobile device 230, relative to workspace 225, may be determined based on mobile device 230 moving out of range of short range wireless communication with one of devices 227 of workspace 225. Other techniques for determining the location of mobile device 230 relative to workspace 225 may alternatively or additionally be used.

Process 600 may further include, when the mobile device moves out of the vicinity of the workstation, suspending operation of one or more of the devices associated with the workstation (block 620). In one implementation, affiliation component 210 may transmit a command to devices 227, indicating that the devices are to enter a suspend state. Alternatively or additionally, mobile device 230 may transmit the command to devices 227 or the devices 227 may initiate the suspend state.

At some point, the user, and hence mobile device 230, may come back into the vicinity of workstation 225. Process 600 may further include detecting the mobile device moving back into the vicinity of the workspace (block 630). When the mobile device moves back into the vicinity of the workspace, process 600 may include ending the suspend state associated with the one or more devices (block 640). For example, affiliation component 210 may transmit a command to devices 227 indicating that the devices are to exit the suspend state and resume normal operation. Alternatively or additionally, mobile device 230 may transmit the command to devices 227 or the devices 227 may determine to end the suspend state (e.g., if device 227 detects mobile device 230 in the vicinity of device 227).

Figure 7:
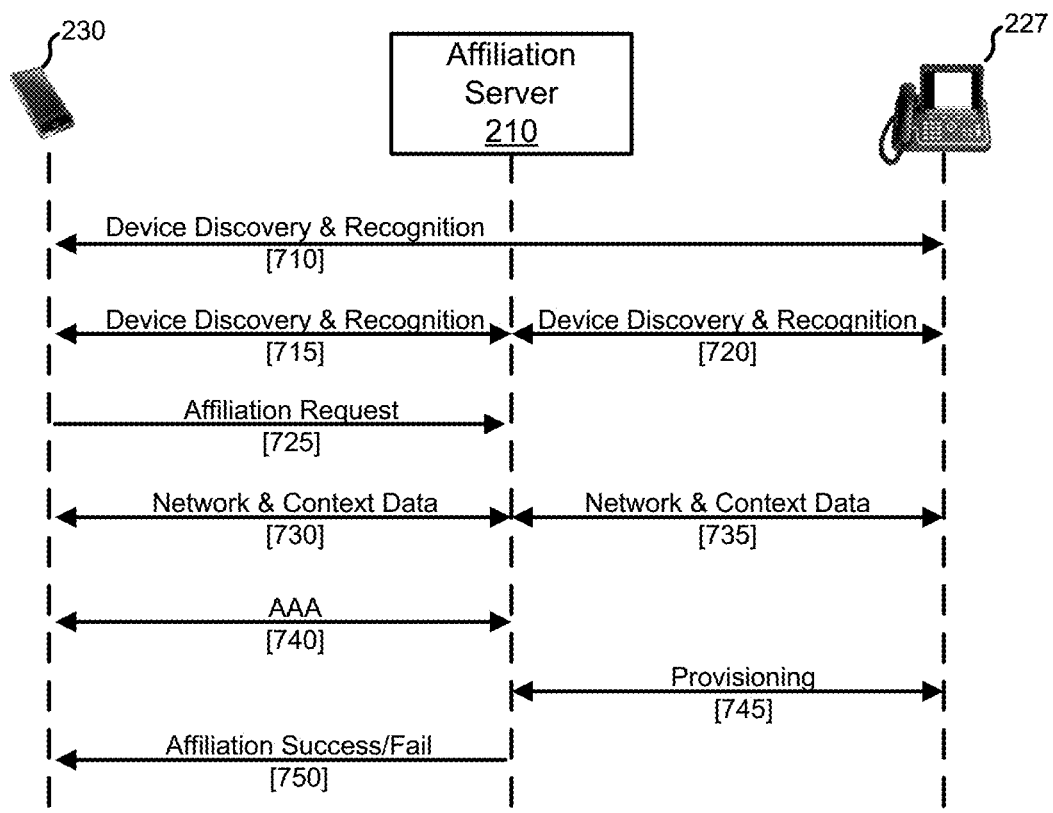
FIG. 7 illustrates a signal flow diagram of example operations for affiliating a user with a target affiliation device.

FIG. 7 illustrates a signal flow diagram of example operations for affiliating a user with a target affiliation device. In this example, mobile device 230 is to be affiliated with device 227, which may include a VoIP-based desktop telephone.

As shown in FIG. 7, mobile device 230 and device 227 may perform device discovery techniques to discover one another (at 710). For example, mobile device 230 and device 227 may directly communicate with one another, such as through Bluetooth, Wi-Fi, Wi-Fi Direct, NFC, or another technique, to discover the presence of one another. In some implementations, mobile device 230 and device 227, as part of the discovery process, may determine the relative locations of one another. For example, in Bluetooth-based discovery, because the range of the Bluetooth signal may be relatively short, discovery of mobile device 230 and device 220, via Bluetooth, may imply that the devices are close to one another.

In some implementations, device discovery may involve user interaction with device 227. For example, as previously mentioned, the user may use mobile device 230 to scan a QR code displayed by device 227. As another example, device 227 may generate an audible signal (a sound), which may be received by mobile device 230 and analyzed to identify device 227. In yet another example, the user may bring mobile device 230 into close proximity of device 227 to communicate via NFC.

Alternatively or additionally to performing device discovery through direct communication between mobile device 230 and device 220, device discovery may be performed using affiliation component 210 as an intermediate device (at 715 and 720). In this situation, mobile device 230 may inform affiliation component 210 of its current location and/or status. Similarly, device 227 may inform affiliation component 210 of the location and/or status. In situations in which device 227 is a device that is fixed in a particular location (e.g., a desktop telephone that is not designed to be moved), affiliation component 210 may store the location of device 227 and may thus not need to dynamically obtain location information for device 227.

At some point, a user of mobile device 230 may indicate a desire to affiliate with device 227. Mobile device 230 may transmit an affiliation request to affiliation component 210 (at 725). Affiliation component 210 may obtain network and/or context data for mobile device 230 (at 730). For example, as previously mentioned, the context may include location information relating to mobile device 230 and/or other information relating to the state of mobile device 230. The network data may include information relating to networks to which mobile device 230 is connected.

In some implementations, affiliation component 210 may also obtain network and/or context data relating to device 227 (at 735). For example, affiliation component 210 may query device 227 to obtain an operating state of device 227 and/or network connectivity information relating to device 227.

AAA functions may be performed to authenticate the user of mobile device 230 and to determine whether the user is authorized to affiliate with device 227. In one implementation, the AAA functions may be performed automatically (i.e., without any additional input from a user of device 230) based on the network and context data (at 740). For example, as previously mentioned, affiliation server 210 may determine one or more confidence scores relating to the network and context data. When the confidence score(s) is greater than a threshold, mobile device 230 may be authenticated. In other implementations, the AAA functions may include receiving additional input from the user. For example, mobile device 230 may request that the user enter a password or enter other authentication information (e.g., mobile device 230 may receive biometric information, etc.). The additional input may only be required, from the user, when the confidence score is below a threshold confidence level.

Affiliation component 210 may provision device 227 to customize the device for the user of mobile device 230 (at 745). In this example, device 227 may be programmed with a telephone number corresponding to the user and with call log history data corresponding to previous calls made or received by the user.

Affiliation component 210 may transmit an indication of whether the affiliation request was successful or whether the affiliation request failed (at 750). Mobile device 230 may display, to the user, an indication of whether the affiliation was successful. Although the above description illustrated an affiliation process with one device 227 associated with a workspace 225, for workspaces with multiple devices 227, the affiliation process may be performed for each device 227. In this situation, affiliation component 210 may transmit a single affiliation success/fail indication (e.g., a successful affiliation request may be transmitted when all devices 227 successfully affiliate).

Hoteling entity 220 may operate a LAN that provides network connectivity to employees of hoteling entity 220. Devices 227, of a workspace 225, may experience difficulty connecting outside of the LAN. In this situation, mobile device 230 may act as an intelligent proxy that can be used to assist in resolving the connectivity issues of device 227.

Figure 8:
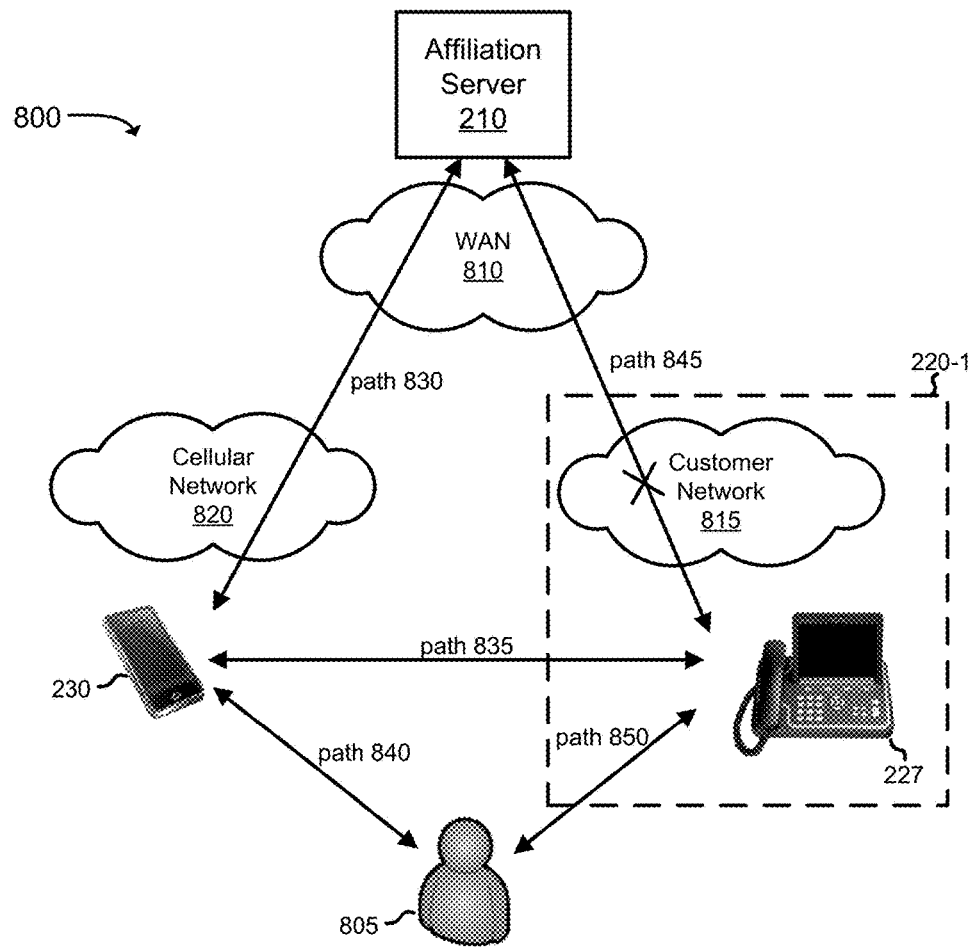
FIG. 8 is a diagram illustrating an example system that may be used to assist in resolving connectivity issues for devices associated with a workstation.

FIG. 8 is a diagram illustrating an example system 800 that may be used to assist in resolving connectivity issues for devices associated with a workstation. As shown, assume that a user 805 wishes to affiliate with a device 227 that is located at hoteling entity 220-1 and that connects to a wide area network (WAN) 810 via customer network 815, which may include a LAN maintained by hoteling entity 220-1. Mobile device 230 may also connect to WAN 810 via cellular network 820. Both device 227 and mobile device 230 may connect to affiliation component 210.

In the example of FIG. 8, lines between devices indicate possible communication paths. As shown, mobile device 230 may communicate with affiliation component 210 (path 830), device 227 (path 835), and user 805 (path 840). Path 835 may include direct communications between mobile device 230 and device 227, and path 840 may include communication via a graphical user interface (or other interface) associated with mobile device 230. Device 227 may similarly communicate with affiliation component 210 (path 845) and with user 805 (path 850). Path 845 may traverse customer network 815.

In some situations, one or more of the communication paths illustrated in FIG. 8 may not be useable. For example, as shown, assume that path 845 is down due to a configuration issue with device 227 connecting to customer network 815. In this situation, mobile device 230 and/or affiliation component 210 may assist user 805 in configuring device 227 to connect to customer network 815. For example, affiliation component 210, or another entity, such as a customer support technician (potentially associated with affiliation component 210), may transmit network diagnostic commands through mobile device 230 (i.e., via path 830 and path 835). Thus, mobile device 230 may function as a proxy to enable communications with device 227 even when the primary network connectivity path of device 227, path 845, is not functioning properly. Affiliation component 210 and/or a customer support technician may issue diagnostic commands through WAN 810 and towards device 227, as well as cause diagnostic commands to be issued by device 227 and towards WAN 810. In one implementation, network connection parameters, associated with device 227, may be remotely configurable by affiliation component 210 and/or the customer support technician. Advantageously, by being able to monitor both end points of the failing network path (path 845), diagnostic and corrective actions relating to the failed network path may be efficiently performed.

Although system 800 is illustrated in the context of an office environment, in some implementations, the concepts described with respect to system 800 may be implemented in a home or residential environment. For example, a telecommunications provider that provides home network (e.g., Internet) connectivity via wired connections (e.g., via fiber optic or coaxial cable connections) may resolve connectivity issues associated with the wired connections by using a mobile device of a home user as a proxy device that enables communication with network devices (e.g., media servers, cable boxes, home computers, etc.) installed in the residence of the home user.

Figure 9:
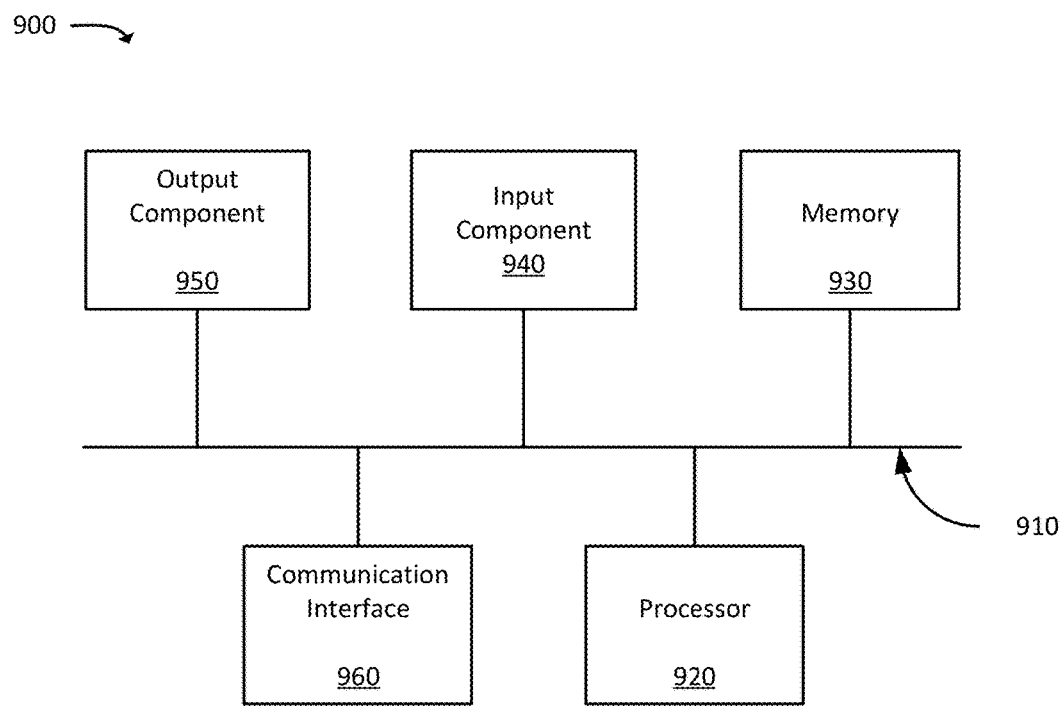
FIG. 9 is a diagram of example components of a device.

FIG. 9 is a diagram of example components of device 900. One or more of the devices described above (e.g., with respect to illustrated in FIGS. 1-3 and 8) may include one or more devices 900. Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. Memory 930 may include any type of dynamic storage device that may store information and instructions for execution by processor 920, and/or any type of non-volatile storage device that may store information for use by processor 920.

Input component 940 may include a mechanism that permits an operator to input information to device 900, such as a keyboard, a keypad, a button, a switch, a microphone, etc. Output component 950 may include a mechanism that outputs information to the operator, such as a display, a speaker, one or more light emitting diodes ("LEDs"), haptics, etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared ("IR") receiver, a Bluetooth radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while series of blocks have been described with regard to FIGS. 4-6, the order of the blocks may be modified in other implementations. Further, non-dependent blocks may be performed in parallel.

Additionally, while series of signals have been described with regard to FIGS. 7 and 8, the order of the signals may be modified in other implementations. Also, non-dependent signals may be sent and/or received in parallel. In some implementations, additional signals may be transmitted before, after, or in between the described signals.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations are described herein in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
  receiving, by one or more computing devices and from a mobile device associated with a particular user, out of a set of users, a request to affiliate the particular user with one or more office devices associated with a physical workspace, wherein the request to affiliate includes identification information of the one or more office devices, the identification information having been obtained by the mobile device and from the one or more office devices;
  using, by the one or more computing devices, the identification information to obtain particular user information that is associated with the particular user;
  provisioning, by the one or more computing devices and based on reception of the request to affiliate, the one or more office devices to customize the one or more office devices for the particular user, wherein the provisioning includes using the obtained user information to customize the one or more office devices;
  receiving, after the one or more office devices have been customized for the particular user, an indication that the mobile device is greater than a threshold distance away from the workspace;
  automatically causing, based on receiving the indication that the mobile device is greater than the threshold distance away from the workspace, suspension of operation of the one or more office devices;
  receiving, after causing the suspension of operation of the one or more office devices, an indication that the mobile device is within the threshold distance of the workspace;
  automatically causing, based on receiving the indication that the mobile device is within the threshold distance of the workspace, the operation of the one or more office devices to resume;
  receiving, from the mobile device and after operation of the one or more office devices has resumed, a request to disaffiliate the particular user with the one or more office devices; and
  disaffiliating, based on the request, the one or more office devices by causing deletion, of the data customizing the one or more office devices for the particular user, including the obtained user information, from the one or more office devices.

2. The method of claim 1, the method further comprising:
  obtaining the identification information based on scanning of a barcode or quick response (QR) code provided by the one or more office devices;
  obtaining the identification information based on an analysis of a sound emitted by the one or more office devices; or
  obtaining the identification information based on connectivity with the one or more office devices via a short range wireless communication standard.

3. The method of claim 1, wherein the request to affiliate with the one or more office devices additionally includes an indication of office devices that are in a vicinity of the mobile device.

4. The method of claim 1, further comprising:
authorizing, by the one or more computing devices, the request to affiliate the particular user with the one or more office devices, wherein the provisioning of the one or more office devices is performed when the authorization is successful.

5. The method of claim 4, further comprising:
receiving context data, by the one or more computing devices and from the mobile device, relating to a current context of the mobile device, wherein the authorization is based on the context data.

6. The method of claim 5, wherein the context data includes information regarding a location of the mobile device.

7. The method of claim 5, wherein the context data includes information describing network connectivity associated with the mobile device.

8. The method of claim 5, wherein the context data includes an indication of office devices that are in a vicinity of the mobile device.

9. The method of claim 1, wherein the request from the mobile device, to disaffiliate the user with the one or more office devices, is sent from the mobile device based on a determination by the mobile device that a present location of the mobile device is greater than the threshold distance from the workspace.

10. A system comprising:
a non-transitory memory device storing a plurality of processor-executable instructions; and
one or more processors to execute the processor-executable instructions, wherein executing the processor-executable instructions causes the one or more processors to:
receive a request to affiliate a particular user, out of a set of users, with one or more office devices associated with a physical workspace, wherein the request to affiliate includes identification information of the one or more office devices, the identification information having been obtained from the one or more office devices;
use the identification information to obtain particular user information that is associated with the particular user;
provision, based on the request to affiliate, the one or more office devices to customize the one or more office devices for the particular user, wherein the provisioning includes using the obtained user information to customize the one or more office devices;
receive, after the one or more office devices have been customized for the particular user, an indication that a mobile device of the particular user is greater than a threshold distance away from the workspace;
automatically cause, based on receiving the indication that the mobile device is greater than the threshold distance away from the workspace, suspension of the operation of the one or more office devices;
receive, after causing the suspension of operation of the one or more office devices, an indication that the mobile device is within the threshold distance of the workspace;
automatically cause, based on receiving the indication that the mobile device is within the threshold distance of the workspace, the operation of the one or more office devices to resume;
receive, after operation of the one or more office devices has resumed, a request to disaffiliate the particular user with the one or more office devices; and
disaffiliate, based on the request, the one or more office devices by causing deletion, of the data customizing the one or more office devices for the particular user, including the obtained user information, from the one or more office devices.

11. The system of claim 10, wherein executing the processor-executable instructions further causes the one or more processors to:
obtain the identification information based on scanning of a barcode or quick response (QR) code provided by the one or more office devices;
obtain the identification information based on an analysis of a sound emitted by the one or more office devices; or
obtain the identification information based on connectivity with the one or more office devices via a short range wireless communication standard.

12. The system of claim 10, wherein executing the processor-executable instructions further causes includes instructions to cause the one or more processors to:
authorize the request to affiliate the particular user with the one or more office devices, wherein the provisioning of the one or more office devices is performed when the authorization is successful.

13. The system of claim 12, wherein executing the processor-executable instructions further causes includes instructions to cause the one or more processors to:
receive context data, from the mobile device, relating to a current context of the mobile device, wherein the authorization is additionally based on the context data.

14. The system of claim 13, wherein the context data includes information regarding a location of the mobile device.

15. The system of claim 13, wherein the context data includes information describing network connectivity associated with the mobile device.

16. The system of claim 13, wherein the context data includes an indication of office devices that are in a vicinity of the mobile device.

17. A non-transitory computer-readable medium, storing a plurality of processor-executable instructions, which, when executed by one or more processors, causes the one or more processors to:
receive a request to affiliate a particular user, out of a set of users, with one or more office devices associated with a physical workspace, wherein the request to affiliate includes identification information of the one or more office devices, the identification information having been obtained from the one or more office devices;
use the identification information to obtain particular user information that is associated with the particular user;
provision, based on the request to affiliate, the one or more office devices to customize the one or more office devices for the particular user, wherein the provisioning includes using the obtained user information to customize the one or more office devices;
receive, after the one or more office devices have been customized for the particular user, an indication that a mobile device of the particular user is greater than a threshold distance away from the workspace;

automatically cause, based on receiving the indication that the mobile device is greater than the threshold distance away from the workspace, suspension of the operation of the one or more office devices;

receive, after causing the suspension of operation of the one or more office devices, an indication that the mobile device is within the threshold distance of the workspace;

automatically cause, based on receiving the indication that the mobile device is within the threshold distance of the workspace, the operation of the one or more office devices to resume;

receive, after operation of the one or more office devices has resumed, a request to disaffiliate the particular user with the one or more office devices; and disaffiliate, based on the request, the one or more office devices by causing deletion, of the data customizing the one or more office devices for the particular user, including the obtained user information, from the one or more office devices.

18. The non-transitory computer-readable medium of claim 17, wherein the plurality of processor-executable instructions further include processor-executable instructions to cause the one or more processors to:

obtain the identification information based on scanning of a barcode or quick response (QR) code provided by the one or more office devices;

obtain the identification information based on an analysis of a sound emitted by the one or more office devices; or obtain the identification information based on connectivity with the one or more office devices via a short range wireless communication standard.

19. The non-transitory computer-readable medium of claim 17, wherein the plurality of processor-executable instructions further include processor-executable instructions to cause the one or more processors to:

authorize the request to affiliate the particular user with the one or more office devices, wherein the provisioning of the one or more office devices is performed when the authorization is successful.

* * * * *